United States Patent [19]
Bietenhader et al.

[11] Patent Number: 5,141,398
[45] Date of Patent: Aug. 25, 1992

[54] ROTARY, VISCOELASTIC DRAG ELASTIC-RETURN AND DAMPING DEVICE FOR A ROTORCRAFT ROTOR BLADE

[75] Inventors: Claude Bietenhader, Lambesc; Robert J. Suzzi, Marseilles, both of France

[73] Assignee: Societe Nationale Industrielle et Aerospatiale, Paris, France

[21] Appl. No.: 600,045

[22] Filed: Oct. 19, 1990

[30] Foreign Application Priority Data

Oct. 20, 1989 [FR] France .................. 89 13799

[51] Int. Cl.[5] ............................................. B64C 27/51
[52] U.S. Cl. .................................... 416/107; 416/140
[58] Field of Search ............. 416/103, 104, 106, 107, 416/134 A, 140, 141

[56] References Cited

U.S. PATENT DOCUMENTS

| | | | |
|---|---|---|---|
| 2,155,427 | 4/1939 | Larsen | 416/106 |
| 2,516,781 | 7/1950 | Magrum-O'Connor | |
| 2,696,271 | 12/1954 | Jovanovich | 416/106 |
| 3,758,230 | 9/1973 | Potter | 416/140 A |
| 4,293,277 | 10/1981 | Aubry | 416/134 A |
| 4,304,525 | 12/1981 | Mouille | 416/140 A |
| 4,494,738 | 1/1985 | Britton et al. | |
| 4,549,850 | 10/1985 | Vincent | 416/134 A |
| 4,915,585 | 4/1990 | Guimbal | 416/141 |
| 5,007,799 | 4/1991 | Mouille et al. | 416/107 |

FOREIGN PATENT DOCUMENTS 643875 8/1947 European Pat. Off. .
1516754 3/1968 France .

Primary Examiner—Edward K. Look
Assistant Examiner—James A. Larson
Attorney, Agent, or Firm—Armstrong, Nikaido, Marmelstein, Kubovcik & Murray

[57] ABSTRACT

The invention relates to a drag elastic-return and damping device (28) for a blade, and a rotor head including it.

The device (28) comprises a connecting rod (30) connected to the blade and transmitting its drag movements to a rotary member (29) for elastic return with incorporated damping whose outer armature (32) it causes to rotate about a coaxial inner armature (31) in order to shear at least one thin collar (33) of a viscoelastic elastomer about its axis (B). The connecting rod (30) is coupled by way of rotational joints (43, 44) to a sleeve (15) for attaching the blade to the hub (1), and to a lever (34) of the outer armature (32). The member (29) is supported at the periphery of the hub (1), between two adjacent blades, or in the sleeve for attaching an adjacent blade such that the corresponding connecting rod is mounted as an inter-blade tie. On the rotor head, each blade is articulated with the hub (1) by a spherical laminated thrust block (5).

26 Claims, 3 Drawing Sheets

ROTARY, VISCOELASTIC DRAG ELASTIC-RETURN AND DAMPING DEVICE FOR A ROTORCRAFT ROTOR BLADE

The present invention relates to drag elastic-return and damping devices for rotorcraft rotor blades, and the invention concerns, more precisely, such a device comprising a member for elastic return with incorporated damping, of the rotary type and whose functioning is ensured by circumferential shearing of a viscoelastic material highly stable to distortions, such as an elastomer.

Numerous forms of members for the elastic return with incorporated damping of rotor blades in drag, by shearing of a viscoelastic material of this type, are already known which are often termed struts for elastic return with incorporated damping, or drag dampers, or alternatively drag frequency adaptors, for the rotor blades of rotorcraft, and in particular of helicopters, and which are mounted such that the angular movements of the blades in their drag plane are transmitted to these members whose viscoelastic material is stressed in shear and ensures damping of these angular movements of the blades by effecting an elastic return of these blades to an initial position which is a neutral position of the blades in drag.

French Patent 2,063,969 in the name of the applicant describes several examples of a device for forming a damped elastic link between the blade and the hub on a rotorcraft rotor, this device comprising means for integrally fastening the blade foot to the hub which combine an elastic element and a damping element. Independently of hydromechanical examples combining the effects of a mechanical spring, such as a helical metal spring or a stack of conical metal washers, with those of a hydraulic damper having a piston mounted so as to slide in a cylinder filled with hydraulic fluid, this document describes, with reference to FIGS. 7 to 9, devices effecting the elastic return of the blades in drag and the damping of the drag oscillations of the blades by shearing of an elastomeric material having particular properties which are a combination of low elasticity and high stability to distortions. In the embodiment of the elastic and damping member shown in FIGS. 7 and 8, this member consists of rectangular, elongated and parallel elastomeric plates which are arranged, alternately, between rigid metal plates, likewise rectangular, parallel and elongated, to which they are adhesively bonded, the metal plates being alternately connected some to the foot of a blade and others to an attachment to the hub so that these metal plates undergo, as a function of the drag oscillations of the corresponding blade, a relative movement in their longitudinal direction which stresses the elastomeric plates in shear in the longitudinal direction in order to ensure the dynamic damping and to effect the elastic return to the initial neutral position. As an alternative, it is also proposed in this document to replace the rigid elongated plates with coaxial tubular elements between which the viscoelastic material is vulcanized, the member thus obtained still constituting a sliding device with small axial deflection. In the embodiment of the elastic and damping member shown in FIG. 9, this member consists of two coaxial stacks each comprising layers of viscoelastic material, made in the form of elastomeric pads which are placed in between superposed circular metal plates or superposed and coaxial metal disks, in which the two metal plates or disks at the axial ends of each stack are stressed by relative rotational movements about their common axis. In order for this to happen, a circular metal disk of one end of the stack is retained on a yoke for attachment to the hub, inside which is mounted a pin for retaining the blade foot, whereas the circular metal disk of the other end of the stack is keyed or spline-fastened onto the retaining pin which is itself integral in rotation with the foot of the blade in the yoke for attachment to the hub. The drag oscillations of the blade relative to the retaining yoke are thus damped with an elastic return to a position which is neutral in drag, by shearing of the flat and thin pads of viscoelastic material in circumferential rotation in their plane.

It should be noted that these elastic-return and damping devices are, in this document, associated directly, on the rotor head, with one and only one blade attachment on the hub, which attachment is provided with a restricted degree of freedom in rotation in the drag plane of the blade, which does not correspond to the structure of the articulated rotors with which modern helicopters currently in service and in development are equipped.

The heads of such modern articulated rotors are described in particular in French Patents 2,427,251, 2,456,034, 2,584,995 and 2,584,996 in the name of the applicant.

In French Patent 2,427,251, the rotor comprises a rigid hub of metal or of a composite structure, of a single piece with the rotor mast or fixed to the top of the latter, for example by bolting, and with which the foot of each blade is coupled via a laminated spherical block, which permits its angular pitch, flapping and drag movements, and via a drag elastic-return strut, comprising elastomeric damping elements working in shear. The peripheral part of the hub, in the form of a flat radial disk or ring, with a convex or substantially circular polygonal periphery, is traversed in the direction of the axis of the rotor by the same number of hollows as there are blades, each laminated spherical block being mounted between the outer edge of one of the hollows and the ends of the inner radial legs of a forked attachment part, integral with the foot of the corresponding blade, each drag elastic-return strut consisting of an alternating stack of metal plates and plates of a viscoelastic material with high residual distortion, and having its ends coupled respectively via rotational joints, one end directly with the foot of one of the blades or on the corresponding forked attachment part, and the other end with a point of the periphery of the hub which is situated between the laminated spherical blocks associated respectively with the blade in question and the immediately preceding blade in the direction of rotation of the rotor. In addition, according to an advantageous mounting, the rotational joint which articulates on the hub one end of the laminated and elongated strut functioning as a linear damper and as a linear elastic-return member has its center situated on the bisector of the longitudinal change-of-pitch axes of the blade in question and of the immediately preceding adjacent blade in the direction of rotation of the rotor when these two blades occupy their neutral position in drag, the center of this rotational joint being simultaneously adjacent to the flapping axis of the blade in question, passing through the center of the corresponding laminated spherical block.

In French Patent 2,456,034, which is an addition to the last-mentioned above French patent, the rigid hub comprises a central shaft, extending the mast of the rotor and carrying an upper radial disk and a lower radial disk, and the outer radial support of each laminated spherical block for retaining and articulating a blade on the hub is encased between the radial edges of the two disks and fixed directly to these edges, in the manner of a rigid brace, whereas the foot of each blade is joined to the other rigid support, or inner radial support, of the corresponding spherical laminated block by a yoke, arranged radially and whose two radial legs spaced apart from one another in the direction of the axis of the rotor are recessed for the free passage of the outer radial support of the laminated spherical block, partially housed between the legs of this radial yoke and between the two radial disks of the hub. Each drag return strut, also realized in this document in the form of an alternating stack of rigid elongated plates and layers of a viscoelastic material, is coupled by its two ends in the longitudinal direction, and via rotational joints, on the one hand to the yoke associated with the corresponding blade, and on the other hand at a point of the central shaft of the hub. In this case too, the plates of viscoelastic material are stressed in longitudinal shear between the elongated rigid plates of the strut, which plates are connected alternately to the blade foot and to the hub, such that the damping and the elastic return exerted are linear.

In French Patents 2,584,995 and 2,584,996, the rotor mast and the hub are realized in the form of an integral tubular mast hub, in a single piece, which has, for each blade of the rotor, one or two lateral openings traversed respectively by one of the two inner radial legs, or by both these legs, of a forked piece for attachment of the blade to the hub, the inner radial ends of the two legs being rigidly linked to the inner radial support of the corresponding spherical laminated block, which is at least partially housed inside the integral tubular mast hub, such that its outer radial support is fixed to the peripheral part of the integral tubular mast hub, which may be shaped with a rim surrounded by a reinforcing composite band, and to which the opening for each blade, or each of the two openings for each blade, is adjacent. The drag damping and the elastic return of each blade to its neutral axis are ensured by an elongated, linearly functioning strut consisting of an alternating stack of rigid plates and plates of a viscoelastic material, or of coaxial and rigid tubes between which is incorporated a cylindrical sleeve made from viscoelastic material vulcanized to the two tubes. Each strut for elastic return with incorporated damping, the structure of which is elongated in the plane of rotation of the corresponding blade, is coupled by way of one of its longitudinal ends, via a rotational joint, to the corresponding blade foot or to the forked attachment piece shaped as a sleeve connecting the blade foot to the hub and, by way of its other longitudinal end, and likewise by way of a rotational joint, to the integral tubular mast hub. Each strut is thus activated axially since, depending on the drag oscillations of the blade, it shortens or lengthens axially such that the viscoelastic material which it contains is stressed in axial shear.

The U.S. Pat. No. 4,645,423 discloses a device with tension/compression connecting rods for damping the drag oscillations of the non-articulated rotor blades of a helicopter, in which each blade foot is connected to the hub by at least one radial arm which is flexible and capable of twisting and whose inner radial end is rigidly linked to the hub, whereas its outer radial end is rigidly linked to the blade foot. This device comprises, for each blade, and hence for each radial arm which is flexible and capable of twisting, at least one rigid connecting rod extending radially, relative to the axis of rotation of the rotor, or longitudinally, relative to the corresponding blade, over the length of the radial arm which is capable of twisting and flexible, being offset laterally relative to this arm in the drag plane of the corresponding blade. The outer radial end of the connecting rod is connected pivotably by way of a first attachment to the outer end of the radial arm, whereas the inner end of the connecting rod is connected pivotably by way of a second attachment to an outer end of a damper, likewise offset laterally in the drag plane of the blade, relative to the corresponding radial arm, and such that the inner end of this damper is linked rigidly to the hub. The bending of the radial arm in the drag plane of the blade thus causes the connecting rod to move translationally and radially and provokes a reaction of the damper, mounted between the inner end of the connecting rod and the hub. This damper produces a damping of the radial translational movement of the connecting rod so as to permit a radial movement of the attachments in response to the bending in drag of the radial arm which is flexible and capable of twisting. One connecting rod is preferably provided on the side of the leading edge, and another connecting rod on the side of the trailing edge of the corresponding radial arm, these two connecting rods extending substantially parallel to this radial arm and each being held spaced apart from the arm which is flexible and capable of twisting by rigid braces, traversed by the connecting rods with the interposition of an elastomeric seal functioning as an auxiliary damper. Each main damper, coupling a tension/compression connecting rod to the hub, is a radial linear damper comprising two sets of rigid radial plates, each set having at least one radial plate, one of the sets being integral with the hub and the other with the piece articulated pivotably on the inner end of the corresponding tension/compression connecting rod. The plates of the two sets are arranged mutually alternately and each plate of a set is connected to at least one plate of the other set by a rectangular and plane layer of a damping elastomeric material adhesively bonded on one side to one set and on the other to the other set of plates, such that the translational movements of the tension/compression connecting rod cause the elastomeric material to shear longitudinally, effecting a translational damping of the movements of the corresponding connecting rod.

It is known that research conducted into the reduction of the aerodynamic drag of new helicopters, with a view to increasing their performance, has lead to making their rotor head as compact as possible. This compactness entails severe limitations on the mounting and size of a certain number of members, including the members for the elastic return with incorporated damping of the blades in drag. When these members are of the "elastomeric" type, employing elastomeric layers sheared between two or four elongated metal plates or sleeves arranged outside the hub, between the latter and the foot of a blade or a sleeve linking the blade foot to the hub, these members then offer to the relative wind, on the one hand a large surface area, and on the other hand a nonaerodynamic shape, which factors have an unfavorable effect on the drag balance of the rotor head. These disadvantages are therefore exhibited by the embodiments described in the abovementioned French patents.

In addition, in these known embodiments, the rotational joints articulating the ends of the members for elastic return with incorporated damping are integrated into these members such that when the rotational joints become worn when in service they must be changed at the same time as these members. This results in high maintenance and service costs.

Furthermore, in all the abovementioned patents, the arrangement of the members for elastic return with incorporated damping substantially parallel to the means linking the blade foot to the hub, or slightly inclined to the radial direction of these means, has the disadvantage that these elongated elastic-return and damping members are only stressed longitudinally with a lever arm in drag which is small relative to the center of articulation of the blade in drag. This results in an elastic return in drag which is too small to place the first vibratory mode of the blade in drag at a value sufficiently far from the nominal speed of rotation of the rotor and compatible with the degree of damping provided by the viscoelastic materials so as to control the risks of the apparition of the vibratory phenomenon termed "ground resonance". In other words, the frequency adaptation permitted by the struts for elastic return with incorporated damping of the abovementioned prior art remains relatively unfavorable except for increasing the stiffness of the elastic return, which results in struts with a more complex structure and a prohibitive size, which is even more unfavorable in terms of the cost and of the aerodynamic drag of the rotor head.

Lastly, it will be noted that, in the abovementioned French patents, when the radial disk or each of the radial disks of the hub, or when the integral tubular mast hub, is reinforced by a rim or belt of a composite structure, which encircles the disk or each disk, or the hub body of the integral tubular mast hub, since the rotational joint articulating each member for the elastic-return with incorporated damping of a blade in drag is retained on the periphery of the hub, radially outside the reinforcing rim or belt, or in a position offset relative to the axis of the rotor with respect to such a rim or belt, the mechanical means for retaining this rotational joint on the hub are not compatible with the use of such a rim or belt to the extent that they do not benefit from its presence.

The invention proposes to overcome these disadvantages and its subject is a drag damping and elastic-return device, for a rotorcraft rotor blade, of the type comprising a member for elastic return with incorporated damping functioning by shearing of a viscoelastic material of high stability to distortions, which lends itself to mounting, in particular on rotor heads on which each blade is connected to the hub by way of a forked attachment part, integral in movement with the foot of the blade, and by way of retention and articulation means which are at least partially housed in a cavity of the hub and between the radial legs of the forked attachment part, and which comprise at least one elastomeric laminated block, and in particular a spherical laminated block, retained between an outer radial support integral with the hub and an inner radial support integral with the two radial legs of the forked attachment part, and such that on a rotor head of this type, the device according to the invention permits a reduction in the drag of the rotor head, as compared with similar devices of the prior art, by virtue of a decrease in the front surface area of the unit formed by the means for linking the blade foot to the hub, and by the device according to the invention, by virtue of an aerodynamic streamlining of the rotor head assembly and by virtue of the improved possibility of fairing the latter.

Another object of the invention is to provide a device of the type presented above whose servicing, on a rotor head, is facilitated and whose maintenance cost is reduced, in particular at the level of the rotational joints subjected to wear when in service.

Yet another object of the invention is to provide a device of the type presented above and whose mounting on a rotor head enables the lever arm stressed in drag to be increased, relative to the center of articulation of the blade in drag, so as to enable the elastic return in drag to be increased, and hence the first vibratory mode which the blade has in drag to be reduced to a sufficiently low value as compared with the nominal speed of rotation of the rotor in order to avoid the risks of the apparition of the vibratory phenomenon of ground resonance.

Yet another object of the invention is to provide a device of the type presented above whose mechanical means for linking to the hub remain compatible with the presence of a composite reinforcing rim or belt.

Lastly, a final object of the invention is to provide a device of the abovementioned type which is at the same time well suited to be mounted on rotor heads having, for each blade, a single flapping, drag and pitch hinge, preferably about the center of a spherical elastomeric block, in particular according to French Patents 2,427,251, 2,456,034, 2,584,995 and 2,584,996, or of a very simple and inexpensive structure, of small size, easy to install and service and allows a high degree of freedom for the positioning of other members of the rotor head, in particular the attachment of the blade foot with two retaining pins, one of which is removable in order to enable the blade to be swung back around the other one, which is then used as a pivoting hinge.

To this end, a drag elastic-return and damping device according to the invention, for a rotorcraft rotor blade on which rotorcraft each blade of the rotor has a foot by way of which it is coupled to a hub, driven in rotation about the axis of the rotor, and retained on the hub by at least one hinge permitting drag oscillations of the blade in the plane of rotation of the blades of the rotor, said device being of the type comprising a member for elastic return with incorporated damping, functioning by shearing of a viscoelastic material highly stable to distortions, placed in between two rigid armatures which can move relative to one another, is defined in that the viscoelastic material is in the form of a thin collar whose inner and outer walls are adhesively bonded to an outer surface of an inner armature and to an inner surface of an outer armature respectively, which outer armature is tubular and arranged coaxially and at least partially around the inner armature and the thin collar and such that said inner and outer surfaces are surfaces substantially of revolution and coaxial about the axis of said member and in that the outer armature of said member has a lever projecting substantially radially outward from the member and on which is articulated, by way of a first rotational joint, a rigid connecting rod of fixed length which is likewise equipped with a second rotational joint intended to make the connecting rod integral in movement with the blade foot, whereas the inner armature is intended to be integrally connected to a support driven by the hub in rotation about the axis of the rotor, which support is not integral in movement with said blade foot, such that with the hunting of the blade being transmitted by the connecting rod to the lever and to the outer armature, which are thus driven in rotation relative to the inner armature about the axis of said member, the thin collar of viscoelastic material is stressed in shear in the circumferential direction and ensures damping in rotation of the relative movements of the two armatures by effecting an elastic return in rotation of these two armatures into a relative initial position corresponding to a neutral position of the blade in drag.

It is understood that in such a device whose structure is advantageously very simple, inexpensive, of a small size and very easy to mount, the member for elastic return with incorporated damping, which may be labeled a rotary viscoelastic member, can be integrally connected to a support driven by the hub such that only the rigid connecting rod is arranged in front or in back of the means linking a blade to the hub so that the front surface area of the assembly thus formed can be reduced.

It is likewise understood that by removing the rotational joints articulating the device of the member for elastic return with incorporated damping and by mounting them at the ends of the rigid connecting rod, it is possible to reduce the maintenance cost, facilitating servicing and, in particular, the operations of replacing the rotational joints when they are worn.

So as to further simplify the structure and to reduce its cost, the thin collar of viscoelastic material is advantageously a truncated cylinder with a circular cross-section, and the corresponding coaxial surfaces of revolution of the rigid armatures to which the inner and outer walls of the thin collar are adhesively bonded, are also cylinders.

However, so as to improve the transverse stability of the rotary viscoelastic member, the coaxial surfaces substantially of revolution of the armatures and the corresponding inner and outer walls of the thin collar of viscoelastic material are at least partially conical.

It is furthermore advantageous that the thin collar of viscoelastic material adhesively bonded by way of its inner and outer walls to the corresponding surfaces, substantially coaxial and of revolution, of the outer and inner armatures, is prestressed in compression between the armatures.

This compressive prestress in the viscoelastic elastomer is favorable for maintaining the gripping of the elastomer to the armatures and further improves the transverse stability of the rotary viscoelastic member.

So as to facilitate the mounting and removal of the link between the lever and the rigid connecting rod of the device according to the invention, the lever which projects substantially radially toward the outside of the rotary viscoelastic member on the outer armature of the latter comprises at its radial outer end a yoke with two cheeks between which is mounted the first rotational joint of the rigid connecting rod.

In such a device, the thinness of the collar of viscoelastic material, shaped into a tubular layer of small radial thickness between the outer and inner armatures, both advantageously tubular and coaxial, enables this collar to form simultaneously a bearing for guiding the rotation of the outer armature around the inner armature, this bearing being capable of sustaining the tensile and compressive shear forces.

In an advantageous embodiment, it is furthermore preferable that the inner an outer armatures have substantially the same axial dimension, and that the two cheeks of the yoke of the lever are substantially plane, substantially parallel to one another and extend substantially perpendicular to the axis of the rotary viscoelastic member, and substantially symmetrically to one another relative to a radial mid plane perpendicular to the axis of the member at half said axial dimension, and in which is situated the center of the first rotational joint of the connecting rod, this first rotational joint being retained in the yoke of the lever by a pin parallel to the axis of the rotary viscoelastic member. An excellent coupling between the connecting rod and the lever of the outer armature of the rotary viscoelastic member is thus ensured, which gives a better stressing in rotation of this outer armature relative to the inner armature of the member.

When each damping and elastic-return member according to the invention is mounted such that its rotary viscoelastic member sustains the absolute movements in drag of a blade relative to the hub, it is preferable that the inner and outer walls of the thin collar of viscoelastic material, and the outer surface of the inner armature and the inner surface of the outer armature, to which said walls of the thin collar are adhesively bonded, each have a substantially symmetrical biconical form, converging towards its central part, in the axial direction. This enables the transverse stability of the rotary viscoelastic member to be increased in its advantageously simple embodiment, comprising only a single collar of viscoelastic material.

In this case, this thin collar of viscoelastic material, of biconical shape, furthermore preferably consists of two frustoconical halves which are substantially symmetrical to one another and turned toward one another by their small base, the inner armature consists of two independent halves which are substantially symmetrical to one another and each of whose outer lateral face is frustoconical and has its small base turned toward that of the other inner armature half, each inner armature half being adhesively bonded to one of the halves, respectively, of the biconical collar, being axially spaced apart when at rest from the other inner armature half and being axially compressed into abutment with the other inner armature half when the rotary viscoelastic member is mounted, so as to prestress the viscoelastic material of the two frustoconical halves of this thin biconical collar in compression.

These technical features relating to the biconical shape of the armatures and of the elastomeric collar, as well as to the compressive prestress in the elastomer, are favorable to the firmness of the anchoring by vulcanization of the elastomer on the armatures and to the transverse stability of the rotary viscoelastic member, which is particularly desirable when it is intended to sustain the absolute movements in drag of a blade relative to the hub.

So as to further facilitate the construction of such a device and the servicing operations on it, the rigid connecting rod of the device is advantageously rectilinear and of adjustable length, each of its ends consisting of a joining piece with a removable rotational joint and which is mounted so as to be axially adjustable relative to a central connecting-rod body. It is thus possible to replace the rotational joints easily by replacing the corresponding rotational joint joining pieces, and to adjust the length of the rigid connecting rod to the distance necessary for satisfactory functioning of the device, between the end yoke of the lever of the outer armature of the rotary viscoelastic member and the anchoring point of the second rotational joint of the connecting rod on the blade foot or the means for linking to the hub which are integrally connected to it.

The subject of the invention is also a rotorcraft rotor head, advantageously equipped with a drag damping and elastic-return device according to the invention and as presented above.

To this end, the rotorcraft rotor head according to the invention, of the type comprising:

a hub driven in rotation by a rotor mast about an axis of the rotor, and, for each blade of the rotor a forked attachment part integral in movement with the foot of the blade and having two inner radial legs spaced apart from one another in the direction of the axis of the rotor, means for retaining and articulating the blade on the hub which are at least partially housed in a cavity of the hub and between the radial legs of the forked attachment part and which comprise at least one elastomeric laminated block retained between an outer radial support integral with the hub, and an inner radial support integral with the two radial legs of the forked attachment part, and permitting the drag oscillations of the blade in the plane of rotation of the blades of the rotor, and a member for the elastic return with incorporated damping of the blade in drag, functioning by the shearing of a viscoelastic material with high stability to distortions placed in between two rigid armatures which can move relative to each other, and such that a first armature of the member is coupled to the foot of the blade, whereas the second armature of the member is coupled to a support for said member, driven by the hub in rotation about the axis of the rotor and not integral in movement with the foot of the blade, is defined in that said member for elastic return with incorporated damping belongs to a drag damping and elastic-return device according to the invention and as presented above, the rigid connecting rod of which is articulated by way of its second rotational joint on said forked attachment part, and the second armature of which is the inner armature fixed to said member support such that the lever integral with the first armature, which is the outer armature of said member, is inclined to the direction passing through the axis of said member and through the center of articulation of said second rotational joint, such that any drag oscillations of the blade are transmitted by the connecting rod to the lever and to the outer armature of the member which are displaced in rotation relative to the inner armature about the axis of the member, so as to stress the thin collar of viscoelastic material in shear in the circumferential direction about its axis, and to ensure a damping in rotation of the relative rotational movements of the two armatures by effecting an elastic return in rotation of these two armatures to an initial relative position corresponding to a neutral position of the blade in drag.

It is clear that such a rotor head benefits directly from the advantages presented above of the drag damping and elastic-return device according to the invention.

On such a rotor head, the positioning of the member for elastic return with incorporated damping of each device according to the invention is advantageously ensured if the inner armature of said member is fixed to the support of said member such that the axis of said member is substantially parallel to the axis of the rotor. This has the advantage that the collar of viscoelastic material can be sheared in rotation about an axis substantially parallel to the axis of the rotor by displacements of the rigid connecting rod which are substantially contained in the drag plane of the blade in question.

In this case, it is advantageous that the second rotational joint is retained between the two cheeks of a yoke projecting laterally from the forked attachment piece on one side of the longitudinal and change-of-pitch axis of this forked attachment piece and of the corresponding blade, preferably such that the center of this second rotational joint is situated substantially in the drag plane of the blade passing through said longitudinal axis. Furthermore, the first and second rotational joints of each connecting rod are then advantageously retained respectively on the corresponding lever and on the corresponding forked attachment piece by pins parallel to the axis of the corresponding rotary viscoelastic member, the center of the first rotational joint being preferably radially outside the axis of said member, relative to the axis of the rotor, such that the rotary viscoelastic member can be stressed by a large lever arm activated in drag, relative to the center of the drag hinge of the blade. This is favorable to an effective elastic return in drag, enabling the first frequency which the blade has in drag to be placed at a value sufficiently far from the nominal speed of rotation of the rotor and compatible with the degree of damping provided by the viscoelastic materials so as to control the risks of the apparition of the vibratory phenomenon termed "ground resonance".

According to an advantageous embodiment, the forked attachment part is a piece substantially shaped into a sleeve in its central radial portion, between its inner radial legs, forming a radial inner yoke for linking to the means for retaining and articulating the blade with the hub, and an outer radial yoke for linking to the blade foot, and this central sleeve portion is a single piece, having its side turned toward the corresponding member for elastic return with incorporated damping relative to its longitudinal axis, with the cheeks projecting laterally from the yoke for retaining the second rotational joint, and, on the opposite side, with a change-of-pitch lever which is inclined so as to project laterally and towards the hub.

As already mentioned above, in the rotor head according to the invention, the means for retaining and articulating each blade on the hub advantageously consist of a spherical laminated block whose center is situated at the intersection of the change-of-pitch, flapping and drag axes of the corresponding blade.

Thus, the rotor head can be such that its hub comprises a single radial disk pierced with the same number of hollows as the number of blades of the rotor, and each forming the cavity for partially housing the corresponding laminated spherical block whose outer radial support is fixed on the outer edge of the hollow and whose inner radial support passes freely through the hollow and is fixed as a brace between the inner radial legs of the corresponding forked attachment piece, on either side of the radial disk, which corresponds to a rotor head constructed according to the teachings of French Patent 2,427,251 in the name of the applicant, except in terms of the structure and mounting of the members for the elastic return with incorporated damping in drag of the blades.

However, it is also possible for, on the rotor head according to the invention, the hub to comprise two radial disks spaced apart from one another in the direction of the axis of the rotor and between which is housed the laminated spherical block for articulating each blade on the hub, the corresponding inner radial support being mounted as a brace between the inner radial legs, of the corresponding forked attachment part, which radial legs have recesses and are engaged between the radial disks of the hub, and the outer radial support of the spherical laminated block likewise being mounted as a brace between the radial edges of the disks, passing through the recesses of the radial legs of the forked attachment part, the rotor head then being constructed according to the teachings of French Patent 2,456,034 in the name of the applicant, except, once more, in terms of the structure and mounting of the drag members for the elastic return with incorporated damping of the blades.

Furthermore, the rotor head according to the invention can also be such that it comprises an integral tubular mast hub pierced, for each blade, with at least one opening for the passage of an inner radial leg of the corresponding formed attachment part, the corresponding spherical laminated block being housed at least partially inside the integral tubular mast hub with its outer radial support fixed on a peripheral part of the mast hub and its inner radial support fixed as a brace between the inner radial legs of the corresponding forked attachment part, the rotor head then being constructed according to the teachings of the French Patents 2,584,995 and 2,584,996 in the name of the applicant, except, once more, in terms of the structure and mounting of the members for the elastic return with incorporated damping of the blades in drag.

In these various rotor head embodiments according to the invention, the drag damping and elastic-return device according to the invention can be mounted according to a first preferred mounting method in which, for each blade, the support for the member for elastic return with incorporated damping integrally connects the inner armature of this member directly to the hub.

This first preferred example of mounting is advantageous and particularly well suited to rotors having a small number of blades, three blades for example, since a zone then always remains available on the periphery of the hub, between the forked attachment parts of two adjacent blades of the rotor, for fixing thereon the inner armature of the rotary viscoelastic member of the damping and elastic-return device of one of these two blades.

In this example of mounting, it is furthermore advantageous if, for each blade, the first rotational joint of the connecting rod is retained on the lever of the outer armature of the corresponding rotary viscoelastic member such that the center of this first rotational joint is substantially situated on the flapping axis of the blade. This has the advantageous effect of making the drag elastic-return and damping device substantially independent of the flapping movements of the corresponding blade.

The rotary viscoelastic member, or member for the elastic return with incorporated damping of each blade can be mounted at the periphery of the hub, directly between the radial edges of the two radial disks of the hub, when the latter is constructed as in French Patent 2,456,034 but, if the hub is constructed as in French Patents 2,427,251, 2,584,995 and 2,584,996, it is possible for the rotary viscoelastic member at the periphery of the hub to be mounted so as to protrude, projecting radially towards the outside of the hub.

In both cases, the inner armature of each rotary viscoelastic member can be integrally connected to the hub by at least one substantially radial support, flange fixed to the hub radially inside a composite reinforcing band which this hub can include. This first example of the mounting of the device according to the invention is therefore compatible with the presence of at least one composite reinforcing band or strap on the hub.

In this first example of mounting, it is furthermore advantageous that each rotary viscoelastic member is mounted on the hub such that its axis and the center of the first rotational joint of the rigid connecting rod are situated substantially in a same radial plane passing through the axis of the rotor and through the bisector of the change-of-pitch axes of the corresponding blade and of an immediately adjacent blade, in the neutral drag position of the blades. In this embodiment, the position of the rotary viscoelastic members on the hub also does not obstruct the movements of the pitch-control levers of the blades which at all times substantially project laterally between two adjacent blades of the rotor.

However, it is also possible, according to a second preferred example of mounting of the damping and elastic-return device according to the invention on a rotor head likewise according to the invention, and for each blade, for the support for the corresponding member for elastic return with incorporated damping to consist of the forked attachment part of an immediately adjacent blade of the rotor such that the corresponding rigid connecting rod is mounted as an inter-blade tie connecting the forked attachment parts of these two adjacent blades.

This second example of mounting is more advantageous than the first for rotors having a relatively high number of blades, for example four blades or more, for which the periphery of the hub is taken up by the forked attachment parts of the blades and the pitch-control levers with which these parts are equipped, which leaves no space available on the hub for fixing the rotary viscoelastic members.

In this second example of mounting, each rotary viscoelastic member is preferably housed and fixed by its inner armature in the forked attachment piece of the adjacent blade such that the axis of this member intersects the longitudinal and change-of-pitch axis of the forked attachment piece of the adjacent blade.

In this case, it is advantageous to use forked attachment parts made, as presented above, in the form of pieces shaped into a sleeve in their central portion, in the radial direction, since each rotary viscoelastic member is then advantageously retained in said central sleeve portion of the corresponding forked attachment part, this central sleeve portion having, on one side of its longitudinal axis, a lateral passage opening for the connection of the first rotational joint of the corresponding connecting rod to the corresponding lever, inclined radially towards the outside relative to the axis of the member and laterally towards the adjacent forked attachment piece to which the corresponding connecting rod is connected as an inter-blade tie, whereas on the opposite side of its longitudinal axis, said central sleeve portion has another lateral opening, between the two cheeks, projecting laterally outward from the yoke for retaining the second rotational joint of the connecting rod connected to the rotary viscoelastic member housed in the adjacent forked attachment part on the other side.

In this embodiment, it will be noted that the housing of each rotary viscoelastic member inside a central sleeve portion is easy because this sleeve portion follows on from the two inner radial legs, whose spacing enables access to the inside of this sleeve portion, and that the positioning of the rigid connecting rod for linking to the sleeve portion for an adjacent blade presents no difficulty when the number of blades of the rotor increases.

This arrangement, in which the rigid connecting rods of the damping and elastic-return devices are mounted as inter-blade ties, can be compared with French Patent Application 88 05816 in the name of the applicant which relates to a rotorcraft rotor head with inter-blade ties for elastic return with incorporated damping. Indeed, each device according to the invention, with its rotary viscoelastic member mounted in a forked piece for linking a blade to the hub, and its rigid connecting rod connected to the forked attachment piece of an adjacent blade, performs the same role as a tie for elastic return with incorporated damping having, in the above-mentioned patent application, an alternating stack of rigid parallel plates and plates of viscoelastic material, according to a general structure known from the prior art presented hereinabove.

However, the device according to the invention advantageously exhibits, as compared with the arrangement shown in this Patent Application 88 05816, a smaller front surface area and, consequently, a lower drag.

The present invention will be better understood and other features and advantages of the invention will become apparent upon reading the description given hereinbelow by way of non-limiting example of two exemplary embodiments described with reference to the attached drawings, in which.

Figure 1:
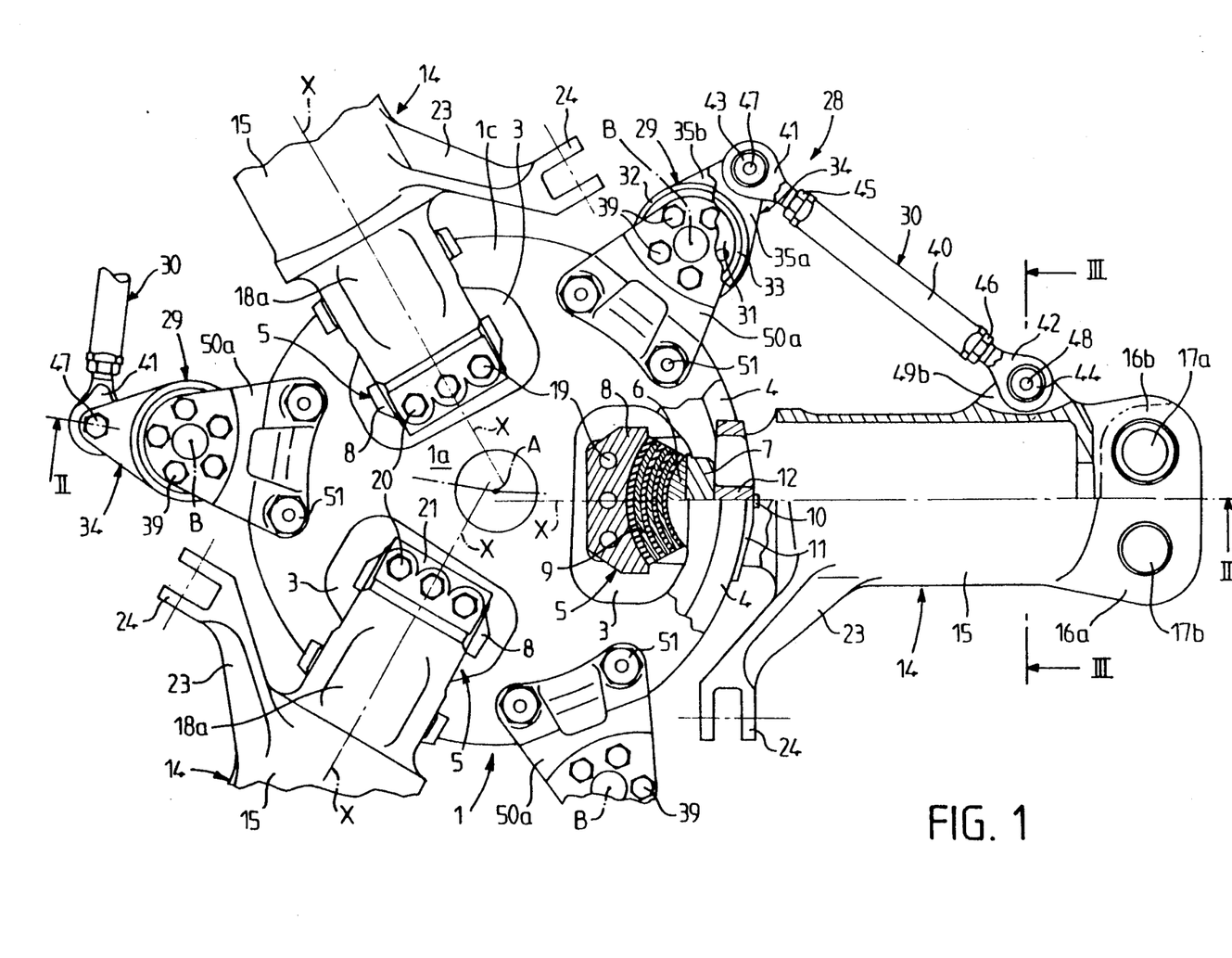
FIG. 1 is a diagrammatic and partial plan view, in partial cross-section and with partial cutaways, of a three-blade helicopter rotor head equipped with drag damping and elastic-return devices for the blades, according to the invention.
Figures 2, 3:
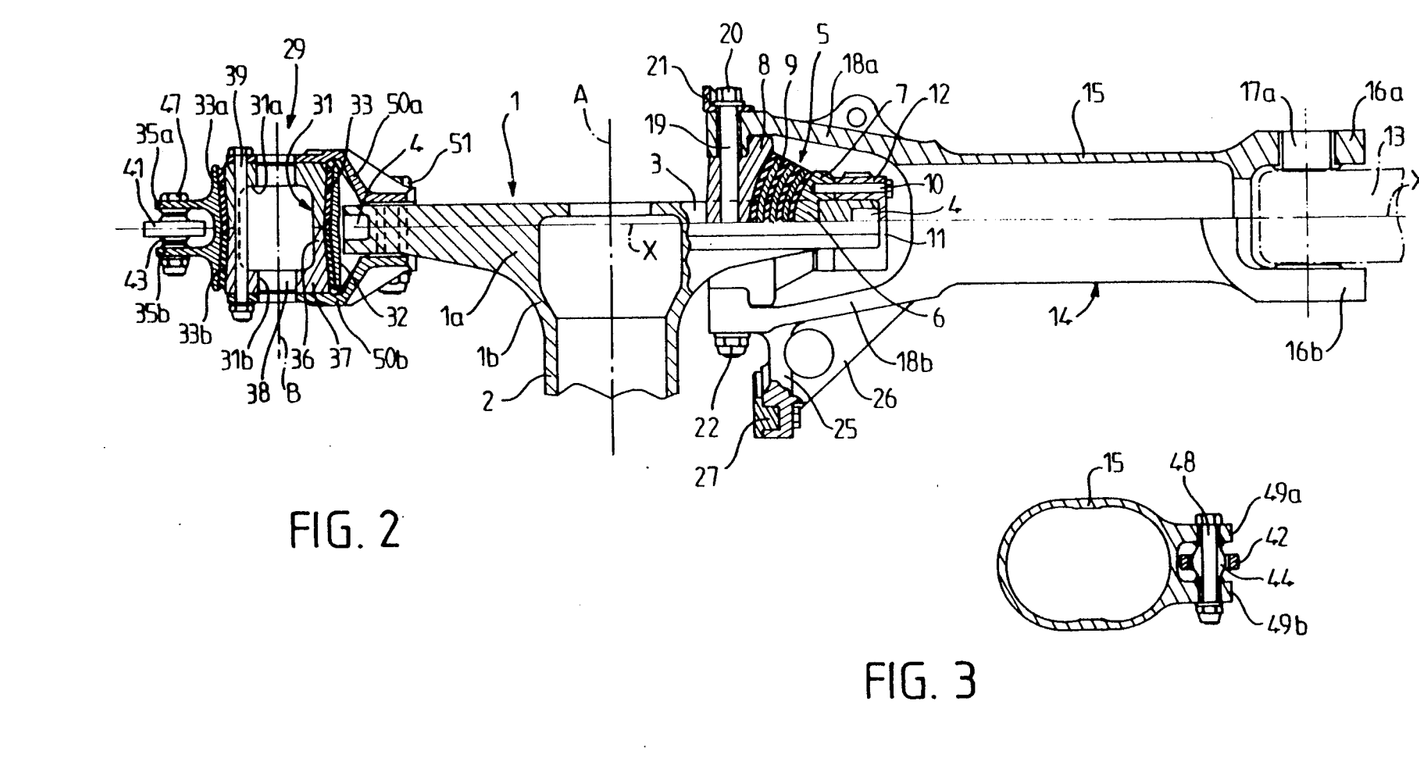
FIG. 2 is a view in partial cross-section along II—II in FIG. 1 and in partial lateral elevation, for the same three-blade rotor head.
FIG. 3 is a view in cross-section along III—III in FIG. 1.

The head of a main, three-blade rotor of a helicopter has been shown diagrammatically in FIGS. 1 and 2. This rotor head comprises a rigid hub 1 in a single piece with the tubular rotor mast 2. The unit formed by the rigid hub 1 and the rotor mast 2 can consist of a single metal piece made from an impact-forged or rough forging. As an alternative, this unit can be made as a composite structure essentially consisting, in the region of the hub 1, of a stack of fabric layers of synthetic and/or mineral fibers with a high mechanical strength which are coated and agglomerated with a hardened synthetic resin. This unit is driven in rotation about the axis A of the rotor by the foot (not shown) of the rotor mast 2, coupled to the output of a main transmission box of the helicopter. The hub 1 has the following composition: its central part 1a exhibits symmetry of revolution about the axis A of the rotor and is joined to the upper part of the tubular mast 2 of the rotor by a frustoconical part 1b, whereas its central part 1a is extended radially (relative to the axis A=outward by a peripheral part or disk 1c, of substantially circular periphery, as can be seen in FIG. 1. The peripheral part 1c of the hub 1, in the form of a disk or flat ring, is traversed in the direction of the axis A of the rotor by the same number of hollows 3 as the rotor has blades, in other words three hollows in this example. Each of these hollows 3, which in plan view can have, for example, the substantially trapezoidal or bean shape which can be seen in FIG. 1, extends in the radial direction from the peripheral part 1a of the hub as far as its central part 1c in which the hollow 3 is defined by an outer radial face, extending in a plane parallel to the axis A and separated from the outer radial face of the peripheral part 1c of the hub 1 by an edge of this hub which is sufficiently wide for a peripheral groove, opening radially outward in the radial outer face of the periphery 1c of the hub 1, to be formed in this peripheral part 1c and on the periphery of the hub 1. A reinforcing band 4 of composite structure is housed in this groove and consists, for example, of a coil of superposed strips of unidirectional rovings of organic and/or mineral filaments of high mechanical strength, agglomerated to one another by a synthetic polymerized-impregnation resin which also stiffens together the superposed strips of rovings forming the band 4. The unit thus formed by the hub 1 surrounded by its composite reinforcing band 4 and by the rotor mast 2 has, by virtue of the structure which has just been described, a high mechanical strength, in particular with respect to the centrifugal tensile forces and to the bending forces applied to the peripheral part 1c of the hub 1.

For each of the three blades of the rotor, a spherical laminated block of a known type, designated as a whole by 5, is housed in a corresponding hollow 3 and retained against the outer edge of the latter. This spherical laminated block 5 comprises a metal, outer radial armature 6, for example made from aluminum or titanium alloy, whose radial inner part is shaped into a convex spherical cup, whereas its radial outer part comprises two lugs 7 engaged above and below the edge of the peripheral part 1c of the hub 1, respectively. in its zone between the hollow 3 and the radial outer face of the hub 1. The spherical laminated block 5 also comprises a radial, inner metal armature 8, made from the same metal as the radial outer armature 6, and whose radial outer part exhibits a concave, spherical cup-shaped recess. An alternating stack 9 of rigid metal cups, in the form of substantially concentric portions of spheres, and of elastomeric layers, is placed in between the concave spherical surface of the radial outer armature 6 and the concave spherical surface of the radial inner armature 8 of the spherical laminated block 5, the unit formed by the outer armature 6, the inner armature 8 and the metal cups and elastomeric layers of the alternating stack 9 being assembled by vulcanization so as to form a body which transmits axial compressions but which is elastically deformable by shearing of the elastomeric layers of the stack 9 so as to permit relative rotational movements of the outer armature 6 relative to the inner armature 8 in all directions about a single center of rotation.

The spherical laminated block 5 is fixed to the hub 1 by its outer armature 6 applied against the radial outer face of the corresponding recess 3 and which straddles the edge of the peripheral part 1c of the hub in the region of this hollow 3 by way of its two lugs 7, each of which is fixed by a screw 10 against a radial lug 12 of a clamp 11 which straddles this edge of the peripheral part 1c of the hub 1 such that its lugs 12 extend above and below this edge, respectively, and radially from the outside towards the inside, facing the lugs 7 of the outer armature 6, against which they are brought into abutment by the screws 10. This clamp 11 and the outer armature 6 of the spherical laminated block 5 are thus rigidly linked to one another, surrounding not only the edge of the hub 1 but also the composite band 4 surrounding the latter. This fixing of the laminated spherical block 5 onto the hub 1 is ensured such that the single center of rotation of this block 5 is situated in the band 4, and preferably in the mid plane of the latter, perpendicularly to the axis A of the rotor.

Each blade of the rotor is connected by way of its foot, such as the blade foot 13, shown in dot-dash lines in FIG. 2, to the corresponding spherical laminated block 5 constituting the means for articulating and retaining the blade on the hub 1 by way of a forked attachment piece referenced as a whole by 14 and which is integral with the foot 13 of the corresponding blade, extending the latter radially towards the hub 1 and being centered on the longitudinal change-of-pitch axis X—X of the corresponding blade. In its central portion, in the radial direction relative to the axis A of the rotor or in its longitudinal axis X—X, this attachment piece 14 is shaped into a sleeve 15 arranged between two radial yokes, each forming one of the ends of the attachment piece 14. The radial outer end yoke of this piece 14 thus consists of two legs 16a and 16b which are substantially plane, parallel to one another and perpendicular to the axis A of the rotor, and spaced apart from one another about this axis in order to receive between them the corresponding blade foot 13. This blade foot 13 is retained between the two legs 16a and 16b of this yoke by two pins 17a and 17b, parallel to the axis A of the rotor and centered in a plane perpendicular to the longitudinal change-of-pitch axis X—X of the blade and of the attachment piece 14, and symmetrically on either side of this axis X—X. One of these two pins, for example 17a, is removable and is engaged, like the other pin 17b in coinciding pierced holes formed in the legs 16a and 16b of the yoke and in the blade foot 13. The removable pin 17a is normally immobilized by any known means such as a metal clip whose removal enables the removable pin 17a to be extracted such that after this extraction it is possible to fold back the blade by causing it to pivot by way of its foot 13 about the other pin 17b, for example toward the rear of the helicopter into the parked position. In its radial inner end part, the attachment piece 14 is also shaped as a radial yoke with two substantially plane, inner radial legs 18a and 18b, the upper leg 18a of which extends the upper part of the sleeve portion 15, whereas the lower leg 18b extends the lower part of this same sleeve portion 15, the two legs 18a and 18b diverging from the sleeve 15 toward their inner radial ends, one, 18a, extending above and the other, 18b, extending below the hub 1 and the corresponding laminated spherical block 5, without contact with the hub and the alternating stack 9 and the outer armature 6 of the laminated block 5 but being integrally connected, by way of their inner radial ends, to the inner radial armature 8 of this laminated block 5. This integral connection is made by way of three bolts 19, parallel to the axis A of the rotor and in a same plane perpendicular to the axis X—X of the piece 14, each of these bolts 19 having a barrel which traverses aligned pierced holes formed in the inner radial ends of the two legs 18a and 18b, and in the inner and solid radial part of the inner armature 8 of the laminated block 5. each bolt 19 having a head 20 which applies, against the upper surface of the upper leg 18a, an upper flapping stop 21 for the blade in question by the effect of a clamping ensured by a nut 22 screwed and retained on the lower threaded end of the bolt barrel 19 which projects beneath the lower face of the lower leg 18b, as shown in FIG. 2. The inner armature 8 of the laminated spherical block 5 is thus mounted as a rigid brace between the inner radial ends of the two legs 18a and 18b of the piece 14 for attaching the blade to the hub via this laminated spherical block 5.

The sleeve 15 of this attachment piece 14, which is made of metal and, for example, aluminum alloy, is in a single piece with a pitch-control lever 23 projecting laterally outward from the sleeve 15, on one side of its axis X—X, and slightly inclined towards the hub 1, from the end of the sleeve 15 which is adjacent to the yoke legs 18a and 18b, this pitch-control lever 23 terminating in a yoke 24 for articulation on the upper end of a pitch link (not shown) connected to a cyclic plate device which is also not shown. It will be noted that the center of the yoke at the end of the pitch-control lever 23 is adjacent to the flapping axis of the corresponding blade, passing through the center, situated in the band 4, of the corresponding spherical block 5.

In addition, the lower leg 18b of the attachment piece 14 is also integral, toward its end adjacent to the rotor mast 2, with a lower flapping stop 25 projecting beneath the lower face of the lower leg 18b and stiffened by a rib 26 which is substantially radial and likewise of a single piece with this lower leg 18b. At its lower end, the lower flapping stop 25 is equipped with a removable friction pad 27 intended to interact with a reciprocal ring (not shown) of known structure which is mounted, in a manner known per se, around the rotor mast 2 and beneath the hub 1, so as to limit the downward flapping movements of the blades.

Similarly, in order to limit the upward flappings of the blades, each stop 21 on the upper leg 18a of an attachment piece 14 can interact with a central mechanism of stops which can be retracted under the influence of the centrifugal force, which mechanism is not shown in the figures and can be fixed onto the upper and central part of the hub 1.

According to the invention, one drag damping and elastic-return device, designated as a whole by 28, is associated with each blade. Each device 28 essentially comprises a member 29 for elastic return in rotation with incorporated damping in rotation by shearing of a viscoelastic material, and a rigid connecting rod 30. The member 29 consists of two rigid tubular armatures which are coaxial about the axis B of the member and one of which is an inner armature 31 fitted inside the other armature, or outer armature 32, and the armatures 31 and 32 are separated from one another by a thin collar of viscoelastic material formed by a tubular layer 33 of small radial thickness of a viscoelastic elastomer of high stability to distortions which is vulcanized to the two armatures 31 and 32. The outer armature 32, which is metal and for example made from steel, has the general external shape of a truncated cylinder of axis B and of circular cross-section, the cylindrical lateral outer surface of which carries, projecting radially towards the outside relative to its axis, a lever 34 made in the form of a yoke with two cheeks 35a and 35b, of a single piece with the armature 32, and which are plane, parallel to one another, perpendicular to the axis of the armature 32 and symmetrical with one another relative to the mid plane of the armature 32, which mid plane is perpendicular to its axis at half its axial dimension. The inner lateral surface of the outer armature 32 is biconical and symmetrical relative to its mid plane, and each of its two frustoconical halves converges from one axial end of the armature 32 towards its mid plane.

The inner armature 31, of substantially the same axial dimension and same axis B as the outer armature 32, but made, for example, from aluminum alloy, consists of two tubular halves 31a and 31b which are separate and symmetrical to one another relative to the mid plane of the member 29. Each armature half 31a or 31b has a frustoconical outer lateral surface, the small base of which is turned towards the small base of the other armature half, the inclination of this frustoconical surface corresponding substantially to that of one half of the biconical inner lateral surface of the outer armature 32. Each inner armature half 31a or 31b consists of a short axial sleeve 36, of small radial thickness, by way of which the corresponding inner half-armature 31a or 31b is adjacent to the other, and a radial, relatively thick cover 37 forming a corresponding axial end of the inner armature 31, the radial covers 37 each being pierced with a circular, central volume-reducing opening 38 which is coaxial. The biconical elastomeric layer 33 consists of two frustoconical halves 33a and 33b which are symmetrical to one another relative to the mid plane of the member 29 and each of which is vulcanized between a frustoconical half of the biconical inner lateral surface of the outer armature 32 and the frustoconical outer lateral surface of an inner half-armature 31a or 31b, whereas as these two half-armature 31a and 31b are axially spaced apart from one another by a certain clearance, which is canceled out by bringing them into axial abutment with one another so as to give a compressive prestress in the elastomer before mounting the member on said hub. This prestress is given to the mounting of the member 29 itself, by canceling out the axial clearance initially left between the inner half-armatures when the elastomer is adhesively bonded taking into account this clearance, which is eliminated by bringing these two inner half-armatures into abutment, which compresses the elastomer. This prestress is maintained by the linking of the inner armature to the hub, which linking is ensured by the bolting holding the half-armatures in axial abutment as explained hereinbelow. In order to permit this integral connection and the maintenance of this prestress, the inner half-armatures 31a and 31b are each pierced with five axial cylindrical bores which are regularly distributed in the circumferential direction about the axis B of the member 29 and which traverse the radial covers 37 and open out in the central recess inside the sleeves 36 of these half-armatures 31a and 31b, being aligned in the extensions of one another from one half-armature to the other so as to be traversed by five axial fastening bolts 39 as described hereinbelow.

The rigid connecting rod 30 is a connecting rod of constant but adjustable length comprising a rectilinear and cylindrical central body 40 which is tubular and internally threaded at each of its ends, in each of which is screwed, in an axially adjustable manner, the threaded shank of a joining piece 41 or 42 with rotational joint 43 or 44, each joining piece 41 or 42 being locked in the desired axial position relative to the connecting rod body 40 by the clamping against the latter of a lock nut 45 or 46 likewise screwed onto the threaded shank of the joining piece 41 or 42.

The connecting rod 30 is articulated on the outer armature 32 of the member 29 by way of the rotational joint 43 of its joining piece 41, which rotational joint is retained between the cheeks 35a and 35b of the lever 34 in the form of a yoke of this armature 32, by way of a pivot 47 of axis parallel to the axis B of the member 29 and formed by a screw/nut assembly such that the center of this rotational joint 41 is in the mid plane of the member 29.

A device 28, whose structure has just been described, is associated with each attachment piece 14 and mounted on the rotor head in the following manner: its connecting rod 30 is articulated to the attachment piece 14 by way of the rotational joint 44 of its joining piece 42, which rotational joint is retained by pivot 48, of axis parallel to the pins 17a and 17b and formed by a screw/nut assembly, between the two cheeks 49a and 49b of a yoke projecting laterally on the sleeve 15, on the side opposite the pitch-control lever 23 of this sleeve 15, relative to its longitudinal axis X—X. As shown in FIG. 3, the cheeks of the yoke 49a and 49b are plane, of a single piece with the sleeve 15, and extend parallel to one another, perpendicularly to the pivot 48 and symmetrically to one another on each side of the drag plane of the blade or of the attachment piece 14, this drag plane corresponding to the plane of rotation of the blade and being defined by its longitudinal axis X—X and by the flapping axis of the blade which is perpendicular to this axis X—X and to the axis A of the rotor, passing through the center of rotation of the laminated spherical block 5, this center itself being situated on the axis X—X and in the reinforcing band 4. The center of the rotational joint 44 can thus be retained substantially in the drag plane of the blade.

The member 29 of the device 28 is integrally connected by way of its inner armature 31 to the peripheral part 1c of the hub 1 so as to be mounted so as to protrude and project laterally outward relative to the zone of the periphery 1c of the hub which extends between the hollow 3 housing the spherical laminated block 5 corresponding to the attachment part 14 of the blade in question, and the adjacent hollow 3 housing the spherical laminated block 5 corresponding to the attachment part 14 of the blade adjacent to the blade in question, on the same side of the axis X—X of the latter as the cheeks 49a and 49b of the yoke for the articulation of the end rotational joint 44 of the connecting rod 40 of the same device 28. This integral connection of the member 29 to the hub 1 is ensured by a clamp mounting device which straddles the hub 1, with the aid of two radial flanges 50a and 50b, each of which are bent back on themselves and ribbed, and mounted substantially symmetrically relative to one another with respect to the mid plane of the peripheral part 1c of the hub 1, which substantially coincides with the drag plane of the blades, such that the upper flange 50a and the lower flange 50b extend, by way of their inner radial part, which is radially ribbed and widened in the circumferential direction relative to the axis A, against the upper face and against the lower face, respectively, of the peripheral part 1c of the hub 1 to which they are directly and simultaneously fastened by two bolts 51 of axis parallel to the axis A of the rotor and which traverse the peripheral part 1c of the hub radially inside the reinforcing band 4, as shown in FIG. 2. The rounded, outer radial parts of the flanges 50a and 50b, each of which are pierced with a central orifice of the same diameter as the opening 38 of each inner half-armature 31a and 31b, and with five bores intended to be aligned with the bores housing the bolts 39 in the half-armatures 31a and 31b, extend against the upper face of the upper half-armature 31a and against the lower face of the lower half-armature 31b, respectively, which armatures are held clamped axially against one another by the bolts 39 engaged in the coinciding bores of the flanges, 50a and 50b and of the half-armatures 31a and 31b, and by nuts screwed and clamped onto the threaded lower ends of the bolts 39 projecting beneath the lower flange 50b. These bolts 39 ensure the axial clamping of the flanges 50a and 50b against the half-armatures 31a and 31b when the member 29 itself is mounted, before it is integrally connected to the hub 1 by way of the other bolts 51, enabling the member 29 to be mounted and disassembled relative to the hub 1. Moreover, by way of the bolts 39, the half-armatures 31a and 31b remain compressed in axial abutment end-to-end and one against the other so as to form the biconical inner armature 31 when in service and to maintain the compressive prestress of the elastomer of the biconical layer 33. By virtue of its relative small thickness in the radial direction, the thin tubular layer 33 of the viscoelastic material performs the role of a bearing, guiding the rotation of the outer armature 32 about the inner armature 31 when the layer 33 is sheared in the circumferential direction about the axis B of the member 29, and absorbs the tensile and compressive shearing forces. In addition, the compressive prestress in the elastomer is favorable to the strength of the anchoring of the elastomer on the inner 31 and outer 32 armatures whose biconical shape increases the transverse stability of the member 29.

This member 29 is mounted so as to protrude on the hub 1 such that its axis B is parallel to the axis A of the rotor, and its transverse mid plane and the center of the rotational joint 43 are in the drag plane of the blade, the axis B of the member 29 and the center of the rotational joint 43 being moreover situated in the radial plane passing through the axis A of the rotor and through the bisector of the longitudinal axes X—X of two adjacent blades between which the member 29 is mounted, when these adjacent blades are in the neutral drag position, and the center of the rotational joint 43 being moreover radially outside the axis B of the member 29 relative to the axis A of the rotor, and simultaneously adjacent to the flapping axis of the blade linked to the attachment piece 14 with which the corresponding connecting rod 30 is articulated, but on the side opposite the end yoke 24 of the pitch-control lever 23 of the same attachment piece 14, relative to the axis X—X of this piece.

As a result, the direction passing through the centers of the rotational joints 43 and 44 of each connecting rod 30 is very inclined to the longitudinal axis X—X of the corresponding attachment piece 14, even when the cheeks 49a and 49b are carried by the end part of the sleeve 15 which is adjacent to the outer radial yoke 16a-16b of the attachment piece 14, and in the example shown in FIG. 1, the connecting rod 30 is radially outside the direction passing through the center of the rotational joint 43 and through the axis B of the member 29, and is substantially oriented perpendicularly to the radial direction passing through the axis B of the member 29 and the center of the rotational joint 43, which rotational joint is retained on the lever 34 projecting radially outward on the outer armature 32 relative to the rotor axis A.

The angular movements of each blade and of its attachment part 14 forwards or backwards in its drag plane, and relative to the direction of rotation of the rotor, thus apply a tensile or compressive stress to the connecting rod 30, with a large lever arm relative to the drag axis of the blade which passes through the single center of rotation of the corresponding laminated spherical block 5. The connecting rod 30 thus drives, by way of its rotational joint 43, the lever 34 and the outer armature 32 of the corresponding member 29 in rotation in one direction or the other about the inner armature 31, which is retained in the fixed position relative to the hub 1, which applies shear stress to the elastomeric tubular layer 33 in the circumferential direction about the axis B of the member 29. This elastomeric tubular layer 33 then exerts a substantial return force in rotation on the outer armature 32 towards its initial rest position about the inner armature 31, this initial position corresponding to a lack of shear strain in the elastomer and, via the rigid connecting rod 30, to a neutral drag position of the corresponding blade and of its attachment piece 14. Consequently, when starting up and stopping the rotor, all the blades occupy their respective neutral position, which prevents the appearance of a substantial imbalance. In addition, by virtue of the high stability to distortions of the elastomeric material of the tubular layer 33, the movements in relative rotation of the inner 31 and outer 32 armatures about the axis B of the member 29, and hence the drag oscillations of the blade, are very considerably damped.

By virtue of the large lever arm with which the member 29 is stressed in drag relative to the point of articulation of the corresponding blade, the elastic return of the member 29 is sufficiently substantial to reduce the first vibratory mode in drag of the blade to approximately half the nominal angular speed of rotation of the rotor, or even to a lower value if necessary, and thus to avoid the risks of the apparition of the vibratory phenomenon of ground resonance.

On this rotor head, each member 29 for elastic return with incorporated damping of a blade in drag is a member which can be termed a rotary viscoelastic member since it ensures by way of the relative rotation of its armatures a damping and an elastic return by shearing, in the circumferential direction, of the tubular layer made from a viscoelastic elastomer vulcanized between the two coaxial tubular armatures, stressed in relative rotation about their common axis B by the drag movements of the blade. The rotary viscoelastic member 29, of a very simple structure, and hence inexpensive, and of a small size, can thus be very easily fixed by the flanges 50a and 50b, which are fixed to its inner armature 31, onto a zone of the periphery 1c of the hub, between two adjacent blades, with the aid of fastening flanges 50a and 50b of a simple structure and which can be easily placed when mounting the member 29 itself, and then when mounting the unit on the hub, and are compatible with a reinforcing band 4 of the hub 1. Similarly, the outer armature 32 of the member 29 can be easily connected to the attachment piece 14 of the corresponding blade, via its lever 34 and the rigid connecting rod 30 which is provided at its ends with rotational joints 43 and 44, which can be easily replaced when they are worn by replacing the removable joining pieces 41 and 42 of the connecting rod 30, without there being any need to disassemble the member 29. Furthermore, there is no need to disassemble the damping and elastic-return device 28 if it is desired to pivot the corresponding blade about the pin 17b. In addition, as all the components of this device 28 are substantially centered in the drag plane of the corresponding blade, and since the center of its rotational joint 43 is substantially on the flapping axis of this blade, the functioning of the device is substantially independent of the flapping movements of this blade.

Furthermore, as only the connecting rod 30 of small maximum cross-section is placed in front of or in back of the sleeve 15 of the corresponding attachment piece 14, it is possible to reduce the front surface area of the assembly formed by the sleeve 15 and the connecting rod 30 by giving the sleeve 15 a flattened shape, visible in FIG. 3 showing the sleeve 15 with an oval cross-section in the drag plane. This enables the whole of the rotor head to be streamlined aerodynamically and offers a better possibility of fairing for this rotor head, it being possible to evaluate this reduction in drag at 5 to 10% of the CxS of the non-faired hub, that is 1 to 2% of the total aerodynamic drag of the helicopter.

Figures 4, 6:
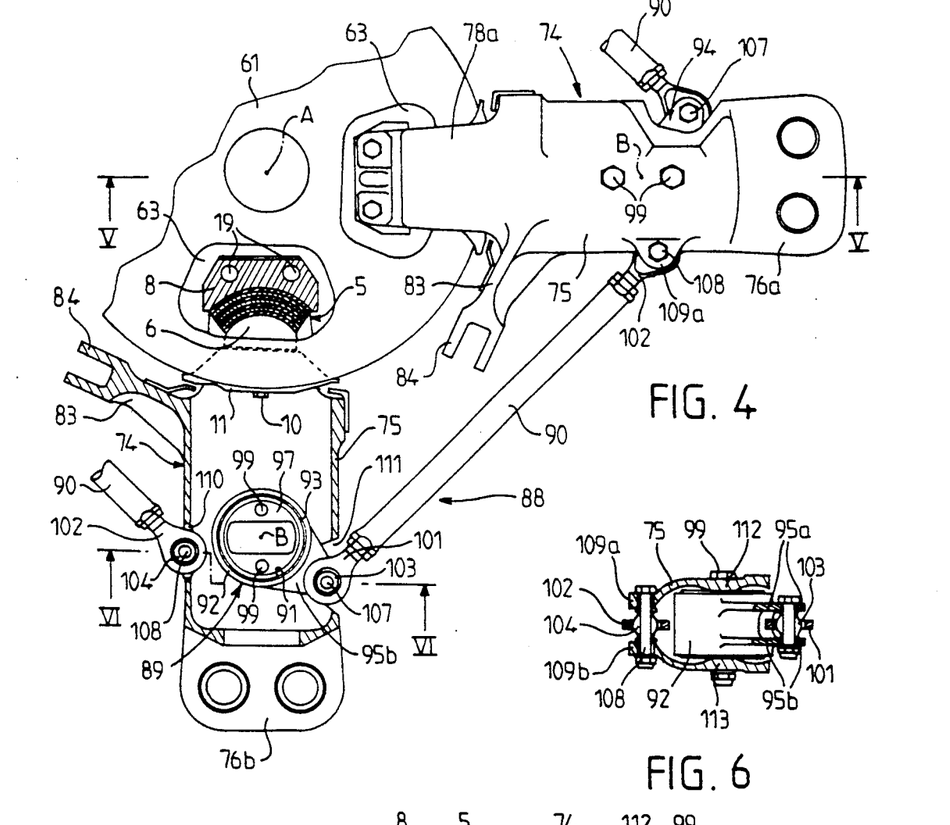
FIG. 4 is a partial plan view, similar to FIG. 1, for a four-blade rotor head having drag damping and elastic-return devices according to the invention.
FIG. 6 is a view in partial lateral elevation and in partial cross-section along VI—VI in FIG. 4.
Figure 5:
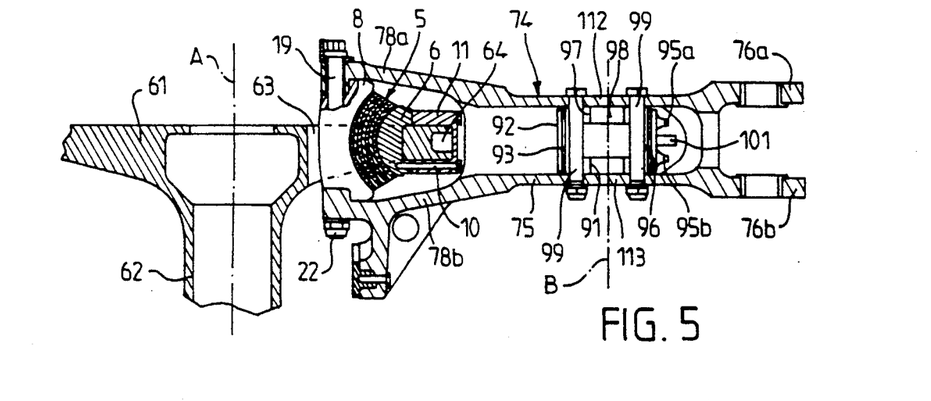
FIG. 5 is a view in partial cross-section along V—V in FIG. 4.

The four-blade rotor head shown in FIGS. 4 and 5 is also that of a main helicopter rotor and has numerous similar components and numerous identical features to those in the example in FIGS. 1 to 3, such that it is therefore not necessary to describe them again in detail and we will limit ourselves to describing hereinbelow the essential differences exhibited by the second example in FIGS. 4 to 6 as compared with the first example in FIGS. 1 to 3.

The hub 61 of this second rotor head, likewise in a single piece with the rotor mast 62 and surrounded by a composite reinforcing band 64, differs essentially from that in FIGS. 1 and 2 only in the fact that it is pierced with four hollows 63 instead of three. A spherical laminated block 5, such as that described in the above example, is likewise housed in each hollow 63 and fixed in the same manner by its outer radial armature 6 onto the outer edge of the hollow 63 and onto the corresponding peripheral part of the hub 61 by way of a clamp 11 and screws 10, whereas its inner radial armature 8 is fixed in the same manner by bolts 19 and nuts 22 as a brace between the inner radial ends of the upper 78a and lower 78b legs forming an inner radial yoke at the end turned towards the hub 61 of a central sleeve 75 of a forked piece 74 for attaching a blade to the hub 61. The outer radial part of this attachment piece 74 is likewise shaped as a yoke with two legs 76a and 76b, between which the foot of the corresponding blade is retained by two parallel pins, under the same conditions as in the above example.

As in the above example, the drag damping and elastic-return device 88 associated with each blade comprises a rectilinear rigid connecting rod 90, of constant but adjustable length, equipped at each of its ends with a joining piece 101 or 102 with a rotational joint 103 or 104, and which connecting rod is articulated by way of its rotational joint 103 between the two cheeks 95a and 95b of a lever in the form of a yoke 94 projecting radially outward from an outer tubular armature 92 of a member 89 for the elastic return in rotation with incorporated damping in rotation of the blade in drag by shearing of a tubular layer 93 of the viscoelastic elastomer in the circumferential direction about its axis, between the outer tubular armature 92 and a coaxial inner tubular armature 91, to which armatures the elastomeric tubular layer 93 is vulcanized.

In this second example, the rotational joint 104 of the connecting rod 90 is retained by a pin 108, parallel to the bolts 19 and therefore perpendicular to the drag plane of the attachment piece 74, between two yoke cheeks 109a and 109b which are of a single piece with the sleeve 75 but project laterally outward from the latter on the same side as its pitch-control lever 83, the center of the end yoke 84 of which remains in the vicinity of the flapping axis of the corresponding blade, passing through the center of rotation of the corresponding spherical laminated block 5. In addition, the two cheeks 109a and 109b are plane, parallel to one another and to the drag plane, and symmetrical to one another relative to this plane, respectively above and below a small lateral opening 110 formed in the side of the sleeve 75 such that the joining piece 102 and the rotational joint 104 are partially engaged in the sleeve 75, as can be seen in FIGS. 4 and 6. The other rotational joint 103 of the connecting rod 90 is, as in the above example, retained by a pin 107 parallel to the axis B of the member 89 between the two cheeks 95a and 95b which are plane, parallel to one another, perpendicular to the axis B of the member 89 and symmetrical to one another relative to the mid plane of this member, and are of a single piece with the outer tubular armature 92, the outer lateral face of which is cylindrical with a circular cross-section. The member 89, however, likewise of the type termed rotary viscoelastic, has an even simpler structure than in the above example by virtue of the fact that the inner lateral face of the outer tubular armature 92, the outer lateral face of the inner tubular armature 91 and the inner and outer lateral faces of the elastomeric tubular layer 93 are all cylindrical of circular cross-section, and coaxial. In addition, the inner armature 91 is made in a single piece and consists of a sleeve in the form of a truncated cylinder with a relatively thin wall 96, each axial end of which is shaped into a relatively thick radial cover 97 pierced with a central oblong opening 98, the two radial covers 97 each being pierced with two diametrically opposed bores which are axially aligned with the bores of the other radial cover for the passage of bolts 99 for fastening this inner armature 91 to a support for the rotary viscoelastic member 89.

The essential difference of this second example as compared with the first is precisely that the support for the member 89 is not a clamp for fastening to the periphery of the hub 61, between two adjacent attachment pieces 74, but the sleeve 75 of the attachment piece 74 of the adjacent blade on the side of the pitch-control lever 83 of the attachment piece 74 of the blade associated with the damping and elastic-return device 88 in question, as is clearly shown in FIGS. 4 and 5. Indeed, before coupling the piece 74 to the spherical laminated block 5 and to the hub 61, the member 89, uncoupled from its connecting rod 90, is engaged between the legs 78a and 78b and introduced into the sleeve 75 between upper and lower 112 and 113 longitudinal parts in the form of substantially plane plates which are thickened towards the inside of the sleeve 75 and are each pierced with two bores aligned with those of the other part, perpendicularly to the drag plane, these bores being centered on the longitudinal axis of the piece 74 and axially offset along this axis by a value corresponding to the center distance of the two bores provided in the inner tubular armature 91 for the fastening bolts 99. These bolts 99 can thus be engaged in the aligned bores of the plates 112 and 113 of the sleeve 75 and of the inner armature 91, and in nuts screwed onto these bolts in order to fasten the inner armature 91 rigidly in the sleeve 75 such that the axis B of the member 89 intersects the longitudinal axis of the attachment piece 74, being perpendicular to this longitudinal axis, and in a position such that the lever 94 of the outer armature 92 is oriented and inclined both radially outward, relative to the hub 61 and to the axis B of the member 89, and laterally outward from the sleeve 75, being directed toward another lateral opening 111 formed in this sleeve 75 on the side opposite the opening 110. The end of the lever 94 thus projects slightly outside the sleeve 75, on the side of the corresponding connecting rod 90, which can thus easily be coupled to the lever by way of its rotational joint 103 and by way of the retaining pin 107.

In such a mounting of the damping and elastic-return devices 88, each rotary viscoelastic member 89 is housed and fastened by way of its inner armature 91, using two bolts 99, inside the sleeve 75 of an attachment piece 74 adjacent to that of the blade whose drag oscillations are transmitted to it by way of the corresponding connecting rod 90, each connecting rod 90 thus being mounted as an inter-blade tie provided with a rotational joint which can be easily disassembled at each of its ends. Consequently, each connecting rod 90 is only stressed in tension/compression, in order to cause the outer armature 92 to rotate about the inner armature 91 so as to shear the elastomeric tubular layer 93 in the circumferential direction and thus to ensure a damping in rotation and an elastic return in rotation, by the differential drag movements of the two blades between which this connecting rod 90 is mounted, and not, as in the first example, by the absolute drag movements of the corresponding blade relative to the hub.

This arrangement of the connecting rods 90 as interblade ties is more advantageous for rotors having four blades or more, for which the periphery of the hub 61 is taken up by the pieces 74 for attaching the blades to the hub, and the pitch-control levers 83 of these pieces 74, these various members then only leaving a small amount of space available for fastening the rotary viscoelastic members such as 89, even though their size is limited.

Moreover, this mode of mounting the damping and elastic-return devices 88 has the same advantages as in the above example: the compactness of the rotary viscoelastic member 89 and the simplicity of its structure and of its fastening and activation means make it possible to arrange it inside a sleeve 75 without there being any need to increase the cross-section of this sleeve, which can remain flattened or ovalized in the drag plane, as shown in FIG. 6. The aerodynamic drag of the rotor head assembly is thus substantially improved under the same conditions. Similarly, each connecting rod 90 is very inclined to the longitudinal axis of the attachment piece 74 on which it is articulated by way of its rotational joint 104 and each connecting rod 90 is substantially perpendicular to the lever 94, in other words in the direction passing through the axis B of the member 89 and through the center of the rotational joint 103, this connecting rod 90 being radially outside the direction passing through the axis B of the member 89 and through the center of the other rotational joint 104, such that the rotary viscoelastic member 89 is stressed with a large lever arm relative to the drag center of the blade, the differential drag movements of which, relative to the blade linked to the attachment piece 74 which supports it, it dampens.

If necessary, in order to obtain a higher degree of damping, a hydraulic damper of known structure can be incorporated into each of the members for elastic return with incorporated damping such as 29 or 89 in the above-described examples.

In these two examples, the rotor head has been described as having a hub realized as described in French Patent 2,427,251. However, this hub can be a hub such as that described in French Patents 2,584,995 and 2,584,996 without any difference resulting in the structure and mounting of the damping and elastic-return devices 28 and 88 described above. Furthermore, the hub could also be realized as described in French Patent 2,456,034 without any difference resulting in the structure and mounting of the device such as 88 described above, whereas a device such as 28 could be installed such that its rotary viscoelastic member such as 29 is fastened by its inner radial armature directly between outer radial zones of the two radial disks of the hub, or also protruding at the periphery of this hub, to which it would be connected by an upper radial flange fastened to the upper radial disk and by a lower radial flange fastened to the lower radial disk of the hub.

As an alternative, it is also possible for the forked attachment parts 14 or 74 not to include any sleeve portion but for each of them to consist of an upper radial plate and of a lower radial plate which are appropriately braced in order to form an inner radial yoke for linking to the hub and an outer radial yoke for linking to the blade foot.

We claim:

1. A drag elastic-return and damping device for a rotorcraft having a rotor with a plurality of blades, which each rotor blade has a foot portion coupled to a hub which is rotatably driven about an axis of the rotor, and which is retained on the hub by a hinge which permits drag oscillations of the rotor blade in a plane of rotation of the rotor blade, said drag elastic-return and damping device comprising:

elastic-return and damping means for damping oscillations of each of said rotor blades, said elastic-return and damping means including:
   (a) at least two rigid armatures with viscoelastic material placed between said armatures, said viscoelastic material forming a collar having inner and outer walls which are adhesively bonded to an outer surface of an inner one of said rigid armatures and to an inner surface of an outer one of said rigid armatures, said outer armature having a tubular shape and being coaxially disposed around said inner armature and said collar, and said inner and outer surfaces are coaxially disposed around an axis of said elastic-return and damping means, said outer armature including a level projecting substantially radially outwardly from said elastic-return and damping means;
   (b) a rigid connecting rod being rotationally attached to said lever at a first rotational joint, said rigid connecting rod having a second rotational joint which is integral in movement with said foot portion;
   (c) said elastic-return and damping means also comprising a support which is connected to said hub, said support having said inner armature connected thereto;

wherein oscillations of said rotor blade are transmitted by said connecting rod, said lever, and said outer armature, and said collar of viscoelastic material is stressed in a circumferential direction and provides a damping of rotation of relative movements of said two rigid armatures through an elastic-return rotation of these armatures into a relative initial position corresponding to a neutral position of the blade in drag.

2. The device as claimed in claim 1, wherein said collar of viscoelastic material comprises a truncated cylinder having a circular cross-section, and wherein corresponding coaxial surfaces of revolution of the rigid armatures to which the inner and outer walls of the collar of viscoelastic material are adhesively bonded, are cylindrical.

3. The device as claimed in claim 1, wherein coaxial surfaces of revolution of the rigid armatures and the inner and outer walls of the collar of viscoelastic material corresponding thereto are at least partially conical.

4. The device as claimed in claim 3, wherein said inner and outer walls of the collar of viscoelastic material and the outer surface of the inner armature and the inner surface of the outer armature, each have a substantially symmetrical biconical form, converging towards a central part thereof, in an axial direction.

5. The device as claimed in any one of claim 3 or 4, wherein said collar of viscoelastic material is prestressed in compression between said two rigid armatures.

6. The device as claimed in any one of claims 3 or 4, wherein said collar of viscoelastic material is prestressed in compression between said two rigid armatures, and consists of two substantially symmetrical frustoconical halves which are turned toward one another by small bases thereof, the inner armature consisting of two substantially symmetrical independent halves each of said independent halves having a frustoconical outer lateral face and has its small base turned toward that of the other inner armature half, each independent inner armature half being adhesively bonded to one of the halves, respectively, of the collar, and being axially spaced apart when at rest from the other inner armature half and being axially compressed into abutment with the other inner armature half when said elastic-return and damping means is mounted, so as to prestress the viscoelastic material of the two frustoconical halves of the collar in compression.

7. The device as claimed in claim 1, wherein said lever projecting substantially radially outwardly from said elastic-return and damping means comprises a yoke disposed at an outer end, said yoke having two cheeks between which is mounted said first rotational joint of said rigid connecting rod.

8. The device as claimed in claim 7, wherein the two rigid armatures have substantially the same axial dimension, and wherein the two cheeks of the yoke are substantially parallel to one another and extend substantially perpendicular to said axis of the elastic-return and damping means, and substantially symmetrical to each other relative to a radial mid plane perpendicular to said axis of the elastic-return and damping means at half of said axial dimension, and in which is situated a center of said first rotational joint which is retained in the yoke by a pin parallel to said axis of the elastic-return and damping means.

9. The device as claimed in claim 1, wherein said rigid connecting rod is rectilinear and of adjustable length, and each of its ends having a joining piece with a removable rotational joint and which is mounted so as to be axially adjustable relative to a central connecting-rod body.

10. A rotorcraft rotor head comprising:
a hub rotatably driven by a rotor mast about an axis thereof, said hub having a plurality of cavities therein;
a plurality of blade assemblies attached to said hub, with each of said blade assemblies comprising:
(a) a blade body having a foot at one end thereof,
(b) a forked attachment portion fastened to said foot, said forked attachment portion having two inner radial legs defining a gap therebetween, said radial legs being spaced apart in the direction of said axis,
(c) retaining and articulating means for attaching the blade assembly to the hub, said retaining and articulating means being partially disposed in one of said cavities, and in said gap between said inner radial legs, said retaining and articulating means including at least one elastomeric laminated block disposed between an outer radial support attached to said hub and an inner radial support integral with said radial legs of said forked attachment portion, said retaining and articulating means permitting drag oscillations of said blade assembly in a plane of rotation of said rotor head; said rotor head further comprising:
elastic-return and damping means for damping oscillations and drag of said blade assemblies, each one of said elastic-return and damping means including at least two rigid armatures with viscoelastic material placed between the armatures, said viscoelastic material forming a collar having inner and outer walls which are adhesively bonded to an outer surface of an inner one of said rigid armatures, and to an inner surface of an outer one of said rigid armatures, said outer armature having a tubular shape and being coaxially disposed around said inner armature and said collar, and said outer wall is coaxially disposed around an axis of said elastic-return and damping means, said outer armature including a lever projecting substantially radially outwardly from said elastic-return and damping means, a rigid connecting rod being rotationally attached to said lever at a first rotational joint, said rigid connecting rod having a second rotational joint which is integral in movement with said foot portion, each of said elastic-return and damping means also comprising a support which is connected to said hub, said support having said inner armature connected thereto, wherein oscillations of said blade assembly are transmitted by said connecting rod, said lever, and said outer armature, and said collar of viscoelastic material is stressed in a circumferential direction and provides a damping of rotation of relative movements of the two rigid armatures through an elastic-return rotation of these armatures into a relative initial position corresponding to a neutral position of the blade assembly in drag, and wherein said rigid connecting rod is articulated by said second rotational joint on said forked attachment portion, and said inner armature and said outer armature are disposed such that drag oscillations of the blade assembly are transmitted by said connecting rod to said lever and to said outer armature of said elastic-return and damping means, which is displaced in rotation relative to said inner armature about said axis of said elastic-return and damping means, whereby said collar of said viscoelastic material is stressed in shear in a circumferential direction about said axis, to ensure a damping of relative rotational movements of said two armatures by effecting an elastic-return in rotation of said two armatures to an initial relative position corresponding to a neutral position of the blade assembly in drag.

11. The rotor head as claimed in claim 10, wherein the inner armature of said elastic-return and damping means is fixed to said support such that the axis of said elastic-return and damping means is substantially parallel to the axis of the rotor head.

12. The rotor head as claimed in claim 11, wherein said first and second rotational joints of each connecting rod are retained respectively on the lever and on the forked attachment portion by pins parallel to the axis of the elastic-return and damping means, with a center of the first rotational joint being preferably radially outside the axis of said elastic-return and damping means, relative to the axis of the rotor head.

13. The rotor head as claimed in any one of claims 10, 11 or 12, wherein the second rotational joint is retained between two cheeks of a lateral yoke projecting laterally from the forked attachment portion on one side of a longitudinal and change-of-pitch axis (X—X) of the forked attachment portion and of the blade, preferably such that the center of this second rotational joint is situated substantially in a drag plane of the blade passing through said longitudinal axis.

14. The rotor head as claimed in claim 13, wherein the forked attachment portion is substantially shaped into a sleeve in a central radial portion thereof, forming a radial inner yoke for linking to the retaining and articulating means, and an outer radial yoke for linking to the blade foot, said central radial portion comprising a single piece, having a side thereof turned towards the elastic-return and damping means for elastic-return with incorporated damping relative to said longitudinal axis (X—X), with the cheeks projecting laterally from said lateral yoke for retaining the second rotational joint, and, on the opposite side, with a change-of-pitch lever which is inclined so as to project laterally and towards the hub.

15. The rotor head as claimed in claim 10, wherein the retaining and articulating means for each blade assembly on the hub consists of a spherical laminated block with a center thereof being situated at an intersection of change-of-pitch, flapping and drag axes of the corresponding blade assembly.

16. The rotor head as claimed in claim 15, wherein the hub comprises a single radial disk provided with a plurality of hollows, and each of said hollows forming the corresponding cavity for partially housing a corresponding laminated spherical block whose outer radial support is fixed on an outer edge of the hollow and whose inner radial support passes freely through the hollow and forms a brace between the inner radial legs of the corresponding forked attachment portion, on either side of the radial disk.

17. The rotor head as claimed in claim 15, further comprising an integral tubular mast hub which includes a least one opening for the passage of an inner radial leg of a corresponding forked attachment portion, with a corresponding spherical laminated block being housed at least partially inside the integral tubular mast hub with its outer radial support fixed on a peripheral part of the mast hub and the inner radial support forming a brace between the inner radial legs of the corresponding forked attachment portion.

18. The rotor head as claimed in claim 10, wherein for each blade assembly, the support for the elastic-return and damping means integrally connects the inner armature directly to the hub.

19. The rotor head as claimed in any one of claims 15, 16 or 17, wherein, for each blade assembly, the support integrally connects the inner armature to the hub, and wherein the first rotational joint is retained on the lever of the outer armature of the elastic-return and damping means such that a center of this first rotational joint is substantially situated on the flapping axis of the blade assembly.

20. The rotor head as claimed in claim 19, wherein said elastic-return and damping means of each blade assembly is mounted at a periphery of the hub.

21. The rotor head as claimed in claim 20, wherein said elastic-return and damping means is mounted so as to protrude, projecting radially towards the outside of the hub.

22. The rotor head as claimed in claim 21, wherein the inner armature of said elastic-return and damping means is integrally fastened to the hub by at least one support flange substantially radial and attached to the hub radially inside a composite reinforcing band of said hub.

23. The rotor head as claimed in claim 18, wherein said elastic-return and damping means is mounted on the hub such that its axis and a center of the first rotational joint of the rigid connecting rod are situated substantially in a same radial plane passing through the axis of the rotor head and through the bisector of a change-of-pitch axis (X—X) of the corresponding blade assembly and of an immediately adjacent blade assembly, in the neutral drag position of the blade assemblies.

24. The rotor head as claimed in claim 10, wherein, for each blade assembly, the support for the elastic-return and damping means consists of the forked attachment portion of an adjacent blade assembly of the rotor head such that the corresponding rigid connecting rod is mounted as an inter-blade tie connecting the forked attachment portions of the two adjacent blade assemblies.

25. The rotor head as claimed in claim 24, wherein said elastic-return and damping means is housed and fixed by the inner armature in the forked attachment portion of the adjacent blade assembly such that the axis of said elastic-return and damping means intersects the longitudinal and change-of-pitch axis (X—X) of the forked attachment portion of the adjacent blade assembly.

26. The rotor head as claimed in claim 14, wherein said elastic-return and damping means is housed and fixed by the inner armature in the forked attachment portion of an adjacent blade assembly such that the axis of the elastic-return and damping means intersects the longitudinal and change-of-pitch axis of the forked attachment portion of the adjacent blade, and wherein each elastic-return and damping means is retained in said central radial portion of the corresponding forked attachment portion, said central radial portion having, on one side of the longitudinal axis thereof, a lateral passage opening for connection of the first rotational joint to a corresponding lever, inclined radially towards the outside relative to the axis of the elastic-return and damping means and laterally towards the adjacent forked attachment portion to which the corresponding connecting rod is connected to an inter-blade tie, whereas on the opposite side of its longitudinal axis said central radial portion has another lateral opening between said two cheeks projecting laterally outward from said lateral yoke for retaining the second rotational joint of the connecting rod connected to the elastic-return and damping means housed in the adjacent forked attachment portion on the outer side.

* * * * *

UNITED STATES PATENT AND TRADEMARK OFFICE
CERTIFICATE OF CORRECTION

PATENT NO. : 5,141,398

DATED : August 25, 1992

INVENTOR(S) : BIETENHADER et al

It is certified that error appears in the above-identified patent and that said Letters Patent is hereby corrected as shown below:

Title page,

[75] Change "MARSEILLES" to --MARSEILLE--.

[73] Change name of assignee from "SOCIETE NATIONALE INDUSTRIELLE ET AEROSPATIALE" to --AEROSPATIALE SOCIETE NATIONALE INDUSTRIELLE--.

Signed and Sealed this

Nineteenth Day of October, 1993

*Attest:*

BRUCE LEHMAN

*Attesting Officer*     *Commissioner of Patents and Trademarks*